United States Patent [19]

Doyel

[11] 4,209,916

[45] Jul. 1, 1980

[54] HAND-OPERATED KITCHEN APPLIANCE FOR DRYING VEGETABLES AND THE LIKE

[76] Inventor: John S. Doyel, 404 W. 20th St., New York, N.Y. 10011

[21] Appl. No.: 945,301

[22] Filed: Sep. 25, 1978

[51] Int. Cl.² ............................................. F26B 17/30
[52] U.S. Cl. .................................. 34/58; 210/360 R; 292/87
[58] Field of Search ................. 34/8, 58; 292/246, 87, 292/88, 89, DIG. 38; 74/789, 792, 801, 802; 210/360 R; 220/324, 326, 306

[56] References Cited

U.S. PATENT DOCUMENTS

| 1,060,865 | 5/1913 | Sundh | 74/801 |
|---|---|---|---|
| 3,420,399 | 1/1969 | Heisler | 220/324 |
| 3,753,297 | 8/1973 | Mantelet | 34/58 |
| 3,822,905 | 7/1974 | Bell | 292/DIG. 38 |
| 3,885,321 | 5/1975 | Fouineteau | 34/58 |
| 4,090,310 | 5/1978 | Koff | 34/58 |
| 4,114,286 | 9/1978 | Bingham | 34/58 |

*Primary Examiner*—Larry I. Schwartz
*Attorney, Agent, or Firm*—Cooper, Dunham, Clark, Griffin & Moran

[57] ABSTRACT

An appliance which is made solely of snap-in molded plastic components includes a strainer for holding the vegetables which is rotated within a covered bowl by a hand crank transmitting the rotational motion through a step-up transmission having a planetary gear and through a frictional fit between a strainer and an easily removable strainer cover.

3 Claims, 8 Drawing Figures

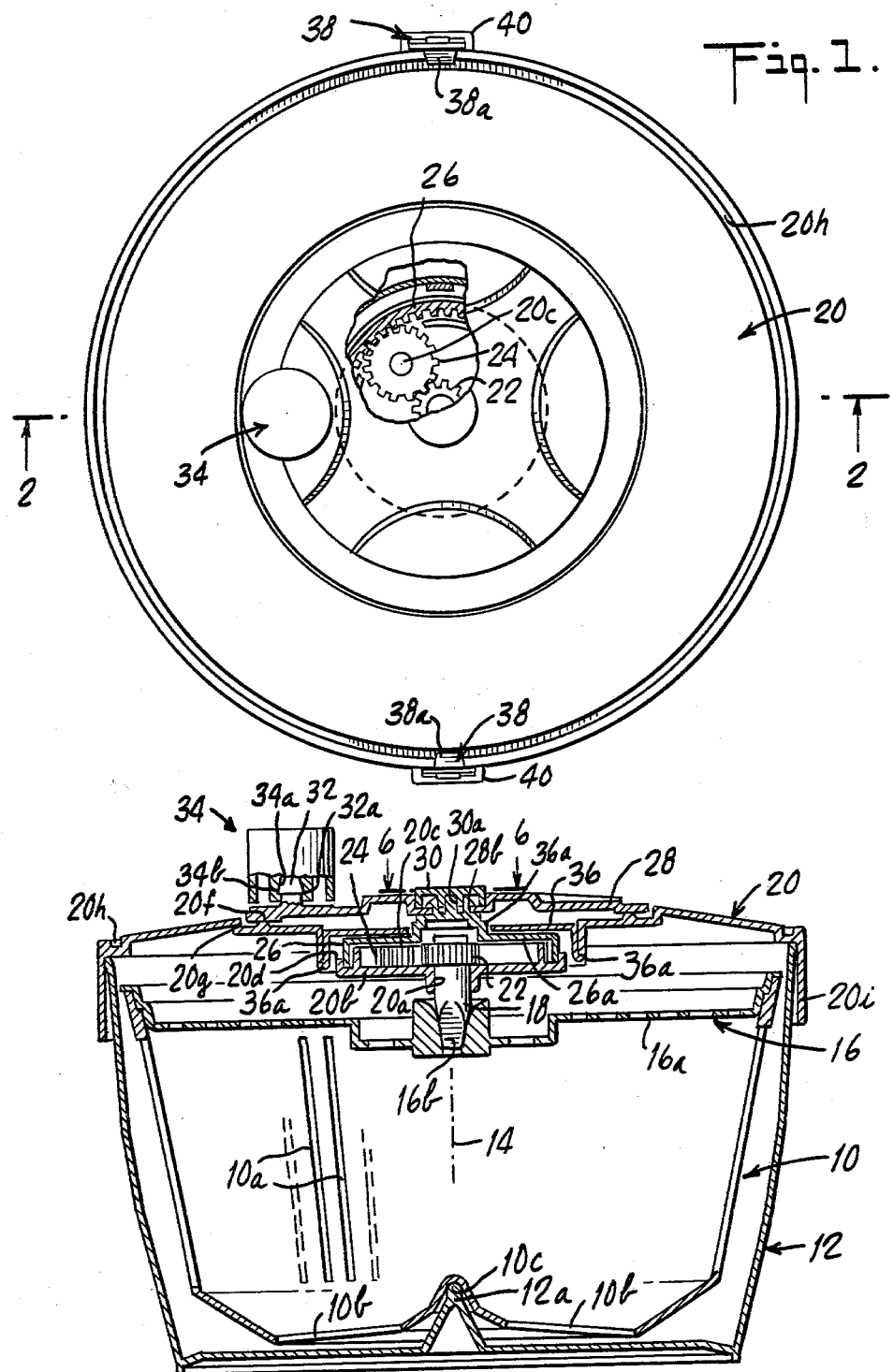

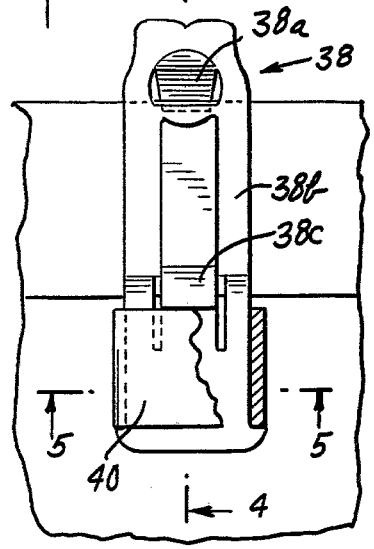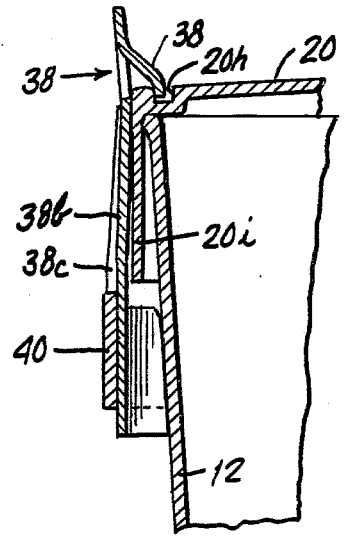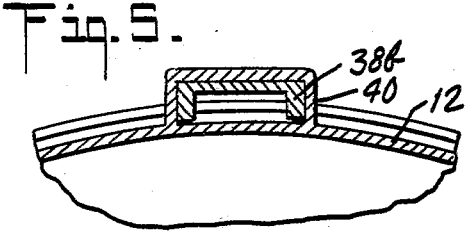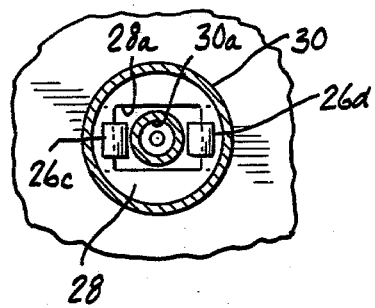

4,209,916

HAND-OPERATED KITCHEN APPLIANCE FOR DRYING VEGETABLES AND THE LIKE

BACKGROUND AND SUMMARY OF THE INVENTION

The invention relates to kitchen appliances used to dry vegetables and the like by means of a rotating strainer. Some examples of devices of this type are shown in U.S. Pat. Nos. 3,885,321 and 3,753,297 and in a brochure of Ronco, Inc. respecting a device which is believed to have been on sale in this country at least as early as 1976. Additional devices which relate to rotating strainers are shown in U.S. Pat. Nos. D-229,271; 3,200,737; 2,138,334 and 1,000,491 and in French Patent No. 742,028.

It is desirable that hand-operated kitchen appliances of this type be inexpensive, durable and easy to operate, and this invention is directed to an appliance of this type. In particular, the appliance which embodies the invention is made solely of parts made of inexpensive molded plastic material which can be inexpensively assembled by hand through snap-in connections. Operation of the appliance is facilitated by minimizing the thickness of the arrangement for driving the strainer (and therefore optimizing the useful capacity of the strainer) and through providng for easy disassembly and cleaning of the appliance.

The appliance includes an open-top strainer which is loaded with the vegetables to be dried. The strainer is perforated at the bottom and sides to permit water to drain by gravity and by centrifugal forces. It is within a bowl which supports it for rotation about a vertical axis. The strainer has a cover which is also perforated and fits frictionally at its open top and can be easily lifted from it by hand. The bowl has a cover which closes its open top and thereby encloses the strainer and the strainer cover in a substantially water-tight fit. A pair of latches at the side of the bowl automatically latch onto the cover when it is in place so as to make it possible to lift the entire appliance by the cover. The strainer is rotated about the vertical axis through a driving arrangement which is supported by the bowl cover and has a driving pin fitting a suitably shaped keyhole in the strainer cover. The driving arrangement includes a turning cover at the center of the bowl cover. The turning cover has an offset crank handle and is affixed to a planetary gear which drives through an idler gear, a driven gear affixed to the driving pin. The three gears are in the same plane so as to minimize the vertical dimension of the driving arrangement and therefore maximize the useful capacity of the strainer.

BRIEF DESCRIPTION OF THE DRAWINGS

FIG. 1 is a top elevational view of the appliance partly broken away to show a step-up transmission.

FIG. 2 is a sectional view along line 2—2 of FIG. 1.

FIG. 3 is a partly side elevational and partly cut-away view of a detail of the appliance showing a cover-retaining latch.

FIG. 4 is a sectional view taken along lines 4—4 of FIG. 3.

FIG. 5 is a sectional view taken along lines 5—5 of FIG. 3.

FIG. 6 is a partial sectional view along lines 6—6 of FIG. 2.

FIG. 7 is an exploded perspective view of a detail showing the snap-in connection of a turning cover and a planetary gear dome.

FIG. 8 is an exploded perspective view showing a detail of a gear cover and a bowl cover.

DETAILED DESCRIPTION

A basket-shaped strainer 10 is supported by a pivot 12a within a bowl 12 for rotation about the vertical axis 14. The strainer 10 has perforated sides and bottom and has an open top. The side perforations are by means of vertical slits some of which are shown at 10a. The bottom perforations are similar radially arranged slots two of which are visible at 10b. The strainer has a cover 16 fitting frictionally at the open top of the strainer. The fit is such that when the cover 16 is rotated about the vertical axis 14 the strainer 10 rotates with it but the cover 16 can be easily lifted by hand from the strainer 10. The cover 16 is also perforated, having circumferential segmental slits defined between circular segments 16a extending between radial ribs (which are not visible in the shown views). The strainer cover 16 has a central keyhole 16b which is rectangular in cross-section and flares in the up direction so as to easily receive a strainer-driving pin 18 which has a tapered lower end also of rectangular cross-section. The fit of the pin 18 in the hole 16b prevents relative rotation between the strainer cover 16 and the pin 18 but permits easy withdrawal of the pin 18 from the hole 16b. The pin 18 is journaled for rotation about the vertical axis 14 within a hole 20a centrally located in a bowl cover 20 which fits over the bowl 12. The pin 18 has a part extending above the lowermost portion 20b of the cover 20, and a driven gear 22 is affixed to that part of the pin 18 to rotate coaxially therewith. An idler gear 24 is journaled on a pin 20c extending up from the portion 20b of the cover 20 and meshes with the driven gear 22. A planetary gear 26 is supported for rotation about the vertical axis 14 between a pair of coaxial circular flanges 20d and 20e extending upwardly from the portion 20b of the bowl cover 20, and meshes with the idler gear 24. The three gears are mounted in a substantially coplanar relationship so as to minimize the height of the step-up transmission which they form. The planetary gear 26 has an integral dome 26a extending upwardly and terminating in a key block 26b which fits in a similarly shaped key slot 28a of a turning cover 28. The key block 26b has a pair of spring latches 26c and 26d which extend upwardly from it and snap-fit at the key slot 28a when the cover 28 is forced down on the dome 26. This snap-fit prevents separation of the turning cover 28 from the dome 26 except by squeezing the latches 26c and 26d toward each other such that their hooks 26e' and 26d' clear the key slot 28a. A cap 30 fits over a central opening 28b of the turning cover 28 and has an opening 30a which faces downwardly and fits frictionally over a pin 26e which extends up from the dome 26. The turning cover 28 is supported by circular bearing flange 20f within a circular depression 20g at the top of the bowl cover 20. An offset turning handle is made up of a pin 32 which extends up from the turning cover 28 and a sleeve 34 which has a central opening 34a shaped to receive the pin 32 in a snap-in lock formed by a notch at 34b and has a mating collar at 32a. A transmission cover 36 fits over the dome 26a permitting the key slot 26b to protrude upwardly therefrom through a central opening 36a. The transmission cover 36 snap-fits in the bowl cover 20 by means of four spring loaded projections 36a which fit within suitably shaped and disposed openings 20j in the bowl cover 20. The bowl cover 20 has a peripheral groove 20h and a downwardly extending skirt 20i. When the cover 20 is being put on the bowl 12 the skirt 20i forces radially outwardly a pair of cover-retaining latches one of which is generally indicated at 38. The latches 38 are resilient and are biased such that when the cover is in its position to close the bowl 12 the hook 38a of each latch 38 snaps in place in the groove 20h. Referring to FIGS. 3-5 the latch 38 comprises, in addition to the hook 38a, an upwardly extending resilient strip 38b which fits within a loop 40 integrally formed with the bowl 12. As best seen at FIG. 4 the space between the loop 40 and the sidewall of the bowl 12 tapers upwardly so that the latch 38 can be inserted into the loop 40 in the upward direction until the latch is wedged within the loop and a projection 38c snaps upwardly against the upper surface of the loop to lock the latch within the loop.

All of the parts of the appliance, including the gears, are molded of inexpensive plastic material and can be easily assembled by hand, without the use of any tools. Specifically, the cover is assembled by pushing the driving pin 18 through the opening 20a in the cover 20 until the gear 22 rests on the part 20b of the cover, the idler gear 24 is placed on the pin 20c to mesh with the gear 22 and the planetary gear 26 is put in its place to mesh with the idler gear. The transmission cover 36 is then snapped into the cover 20 by having its projections 36a snap-fit into the corresponding holes 20j in the cover 20. The turning cover 28 is snap-fitted onto the dome 26a of the planetary gear and the cap 30 is friction-fitted down onto the pin 26e of the key block 26b. The sleeve 34 is then snapped onto the pin 32 to form the crank handle. The cover-retaining latches 38 are snap-fitted up through the loops 40 as described, and the appliance is ready for use.

In use, the material to be dried is put in the strainer and the strainer is put in the bowl with its bottom central recess 10c resting on the pivot 12a. The strainer cover 16 is fitted by hand at the top of the strainer, and the bowl cover 20 is put on top of the bowl such that its driving pin 18 fits within the keyhole 16b of the strainer cover 16 and the cover-retaining latches 38 snap in place in the peripheral groove 20h of the cover 20. The turning cover is manually rotated about the axis 14 by means of the crank handle sleeve 34, which freely rotates about the pin 32, and thus rotates the strainer 10 at a higher speed to extract moisture from the vegetables in it mainly by centrifugal force. This moisture runs down the inside of the sidewall of the bowl 12 and collects in the clearing between the bottom of the bowl and the strainer 10.

The rotational motion is transmitted from the turning cover to the planetary gear through the keyed connection between the dome and the turning cover. The planetary gear rotates the idler gear, which in turn rotates the driven gear and thereby the driving pin. The driving pin 18 in turn rotates the strainer cover 16 and the strainer cover 16 rotates the strainer 10 through the frictional fit therewith.

The appliance can be easily picked up by the cover 20 or the skirt 20i thereof and moved about as desired. It is opened by grasping the top end of the cover-retaining latches 38 and bending the latches outwardly, to move the hooks 38a away from the cover 20 until they clear the cover, while simultaneously lifting the cover 20. Lifting of the cover 20 does not remove the strainer cover 16 since the driving pin 18 easily withdraws from the keyhole 16b of the strainer cover 16. The strainer bowl 10 can be picked up from the bowl 12 with the strainer cover 16 still on it, or the strainer cover 16 can be picked up first. The entire appliance can be washed with no adverse effects on any of the moving parts, and the appliance can be disassembled if desired without the need for any tools or with minimal tools.

Directional terms used as "up", "down", "vertical" and the like apply to the view illustrated in FIG. 2; it should be clear that in use or in the course of assembly or disassembly the appliance can be oriented differently.

I claim:

1. A hand-operated kitchen appliance for drying vegetables and the like comprising:
   an open-top bowl and an open-top strainer supported by the bowl for rotation therein about a vertical axis, said strainer having a cover which closes the strainer by fitting frictionally at the open top thereof and is manually removable therefrom and has a centrally located keyhole, and said bowl having a cover closing the bowl by fitting over the open top thereof and enclosing the strainer and strainer cover,
   a pair of cover-retaining latches secured to the outer side of the bowl near the top thereof and spaced from each other around the circumference of the bowl, said bowl cover having a groove extending around the exposed top periphery thereof and each of said cover-retaining latches having a hook extending toward the bowl cover and fitting within the groove thereof when the cover is in position to close the bowl, said cover-retaining latches being resilient and biased to urge said hooks toward and into the groove, said latches being deformable manually to move the hooks thereof away from the groove and the bowl cover to thereby release the bowl cover and permit manual removal thereof from the bowl,
   means for driving the strainer bowl, said driving means being secured to the bowl cover and comprising a vertical strainer-driving pin journaled at the center of the bowl cover and having a shaped lower end extending toward the strainer and receivable in the keyhole of the strainer cover when the bowl cover is in position to close the bowl, said pin fitting in the strainer cover in a fit preventing relative rotation therebetween but permitting manual withdrawal of the pin from the strainer cover, a turning cover rotatably mounted centrally on the bowl cover and having an offset crank handle and a step-up transmission connecting the turning cover to the driving pin to cause the pin to rotate at a given speed when the cover is rotated at a lower speed by means of the crank handle, said rotation at a given speed being imparted to the strainer cover through the pin and to the strainer through the frictional fit between the strainer cover and the strainer,
   said appliance being made of molded plastic components fitted frictionally or by snap-in connections to form the appliance,
   wherein the entire appliance may be picked up by holding only the bowl cover when the cover-retaining latches are in a position to hold the bowl cover, and wherein the strainer cover remains on the strainer when the bowl cover is picked up from the bowl, and the strainer can be picked up from the bowl or loaded into the bowl with the strainer cover on it.

2. An appliance as in claim 1 in which the stepup transmission of the driving means comprises a driven gear affixed coaxially to the strainer-driving pin to rotate therewith and supported at the upper side of the strainer cover, an idler gear meshing with the driven gear, said bowl cover having an upwardly extending pin on which the idler gear is journaled, a planetary gear meshing with the idler gear and supported at the upper side of the bowl cover for rotation coaxially with the driving pin, said planetary gear having an upwardly extending integral dome which has an upwardly extending key block, said turning cover having a key slot shaped to receive the key block, said key block and key slot interfitting in a snap-in connection whereby when the turning cover is rotated by means of the crank handle the rotational motion is imparted to the planetary gear through the interlock connection between the key slot and the key block and a rotation at a higher speed is imparted to the driving pin through the idler gear and the driven gear.

3. An appliance as in claim 1 or claim 2 in which the bowl includes a pair of integrally formed loops extending radially outwardly from locations spaced from each other around the circumference of the bowl and said cover-retaining latches comprise a pair of resilient strips manually fitted in a snap-in connection within said loops and having said hooks at the upper ends thereof.

* * * * *